US011915487B2

(12) United States Patent
Ambrus et al.

(10) Patent No.: US 11,915,487 B2
(45) Date of Patent: Feb. 27, 2024

(54) SYSTEM AND METHOD FOR SELF-SUPERVISED DEPTH AND EGO-MOTION OVERFITTING

(71) Applicant: TOYOTA RESEARCH INSTITUTE, INC., Los Altos, CA (US)

(72) Inventors: Rares A. Ambrus, San Francisco, CA (US); Vitor Guizilini, Santa Clara, CA (US); Sudeep Pillai, Santa Clara, CA (US); Adrien David Gaidon, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 544 days.

(21) Appl. No.: 16/867,124

(22) Filed: May 5, 2020

(65) Prior Publication Data
US 2021/0350222 A1    Nov. 11, 2021

(51) Int. Cl.
G06V 20/56     (2022.01)
G06N 3/08      (2023.01)
G06T 7/50      (2017.01)
G06F 18/214    (2023.01)
G06V 10/764    (2022.01)
G06V 10/82     (2022.01)

(52) U.S. Cl.
CPC .......... *G06V 20/56* (2022.01); *G06F 18/214* (2023.01); *G06N 3/08* (2013.01); *G06T 7/50* (2017.01); *G06V 10/764* (2022.01); *G06V 10/82* (2022.01)

(58) Field of Classification Search
None
See application file for complete search history.

(56) References Cited

U.S. PATENT DOCUMENTS

| 9,612,123 | B1* | 4/2017 | Levinson | B60L 3/0015 |
| 2019/0311259 | A1 | 10/2019 | Cricir et al. | |
| 2019/0325644 | A1* | 10/2019 | Bleyer | G06T 17/20 |
| 2020/0193623 | A1* | 6/2020 | Liu | G06N 3/0454 |
| 2021/0350222 | A1* | 11/2021 | Ambrus | G06T 7/55 |

FOREIGN PATENT DOCUMENTS

WO    2020008104 A1    1/2020

OTHER PUBLICATIONS

Pradeep et al., MonoFusion: Real-time 3D reconstruction of small scenes with a Single Web Camera, 2013 IEEE International Symposium on Mixed and Augmented Reality (ISMAR), 2013, pp. 83-88 (Year: 2013).*
Wan, et al., "Self-Supervised 3D Hand Pose Estimation Through Training by Fitting", Computer Vision Foundation, 2019, pp. 10853-10862.

(Continued)

*Primary Examiner* — Peter Hoang
(74) *Attorney, Agent, or Firm* — SEYFARTH SHAW LLP

(57) ABSTRACT

Systems and methods to improve machine learning by explicitly over-fitting environmental data obtained by an imaging system, such as a monocular camera are disclosed. The system includes training self-supervised depth and pose networks in monocular visual data collected from a certain area over multiple passes. Pose and depth networks may be trained by extracting data from multiple images of a single environment or trajectory, allowing the system to overfit the image data.

17 Claims, 3 Drawing Sheets

(56) References Cited

OTHER PUBLICATIONS

Kim, et al., "Fast Depth Estimation in a Single Image Using Lightweight Efficient Neural Network", NCBI, Oct. 13, 2019, pp. 1-17.

Shi, et al., "Self-Supervised Learning of Depth and Ego-Motion With Differentiable Bundle Adjustment", https://arxiv.org/abs/1909.13163, Sep. 28, 2019, pp. 1-10.

* cited by examiner

SYSTEM AND METHOD FOR SELF-SUPERVISED DEPTH AND EGO-MOTION OVERFITTING

FIELD OF TECHNOLOGY

The present disclosure relates to improving machine learning, and more particularly, to training self-supervised depth and pose networks in monocular visual data by over-fitting the image data.

BACKGROUND

Machine learning provides a basis for the design, programming and operation of autonomous vehicles. Autonomous and semi-autonomous vehicles may be trained according to environmental and situational data allowing the vehicle to operate and navigate known and unknown trajectories. Sensors installed and configured on an ego vehicle, i.e., an autonomous or semi-autonomous vehicle, provide environmental data to a machine learning system. Monocular cameras can be a cost-effective approach when compared to more complex imaging systems including LiDAR, stereo cameras or the like, however the sensor data from monocular cameras does not explicitly include depth information. Instead, the vehicle implements processing routines that derive depth information from the monocular images.

One of the challenges in machine learning is generalization, i.e. the ability to train a model in a certain domain in such a way that it can be transferred to another domain and still maintain its accuracy. Such a capability is obtained by learning features that are more representative of underlying data structure, rather than random disturbances. For example, in an ego vehicle, generalization may occur when machine learning is dictated by the geometry of a scene rather than illumination patterns, or other perceivable differences. In traditional machine learning environments, generalization is desired. If a model is trained using data that is too specific, the model is said to be overfit. Overfitting occurs when a model is trained on detailed data such that a consistent increase of performance in the training (or validation) data occurs at the learning stage, but also experiences a consistent decrease in test performance, meaning that the learned features are too specialized. Overfit models may be more accurate when handling known data, but less accurate when handling new data.

SUMMARY

Aspects of the present disclosure provide for systems and methods to improve machine learning by explicitly over-fitting environmental data obtained by an imaging system, such as a monocular camera. Aspects of the present disclosure include training self-supervised depth and pose networks in monocular visual data collected from a certain area over multiple passes. That is, pose and depth networks may be trained by extracting data from multiple images of a single environment or trajectory, allowing the system to overfit the image data. The resulting models are then used to generate high-fidelity, three-dimensional reconstructions of a scene, with the pose networks outputting the relative pose between pairs of images and the depth network to project two dimensional pixels into three-dimensional points.

According to one aspect a system for generating depth estimates of an environment is disclosed. The system may include one or more processors, a memory communicably coupled to the one or more processors and storing a depth system. The depth system may include instructions that when executed by the one or more processors cause the one or more processors to, in response to, to generate a plurality of depth maps by receiving a plurality of monocular images. Each of the plurality of monocular images capturing substantially the same environment. Each of the monocular images may be processed according to an overfit depth model. An image module may include instructions that when executed by the one or more processors cause the one or more processors to generate a three-dimensional reconstruction of the environment based on the plurality of depth maps.

According to another aspect, a method of generating depth estimates of an environment is disclosed. The method may include receiving a plurality of monocular images. Each of the plurality of monocular images capturing substantially the same environment. Each of the monocular images may be processed according to an overfit depth model to generate a plurality of depth maps. The plurality of depth maps may be used to generate a three-dimensional reconstruction of the environment.

According to another aspect of the present disclosure, a non-transitory computer-readable medium for generating depth estimates of an environment is disclosed. The medium may include instructions that when executed by one or more processors cause the one or more processors to receive a plurality of monocular images. Each of the plurality of monocular images may capture substantially the same environment. Each of the monocular images may be processed according to an overfit depth model to generate a plurality of depth maps. From the plurality of depth maps, a three-dimensional reconstruction of the environment may be generated.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide for systems and methods to improve machine learning by explicitly overfitting environmental data obtained by an imaging system, such as a monocular camera. Aspects of the present disclosure include training self-supervised depth and pose networks in monocular visual data collected from a certain area over multiple passes. That is, pose and depth networks may be trained by extracting data from multiple images of a single environment or trajectory, allowing the system to overfit the image data. The resulting models may then be used to generate high-fidelity, three-dimensional reconstructions of a scene, with the pose networks serving to position the camera in a global frame of reference and the depth network to project two dimensional pixels into three-dimensional points.

Figure 1:
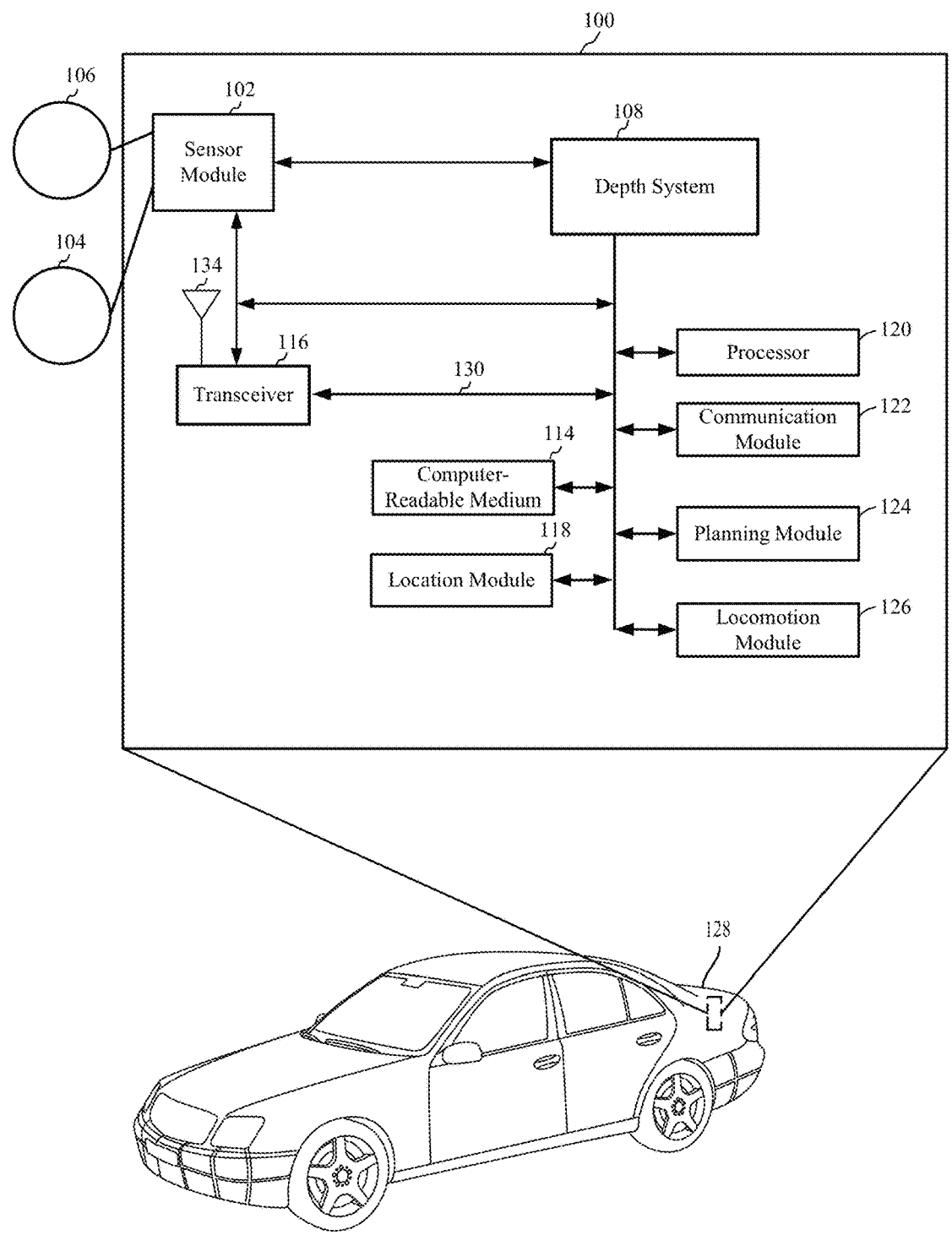
FIG. 1 is a diagram of a vehicle system according to one aspect of the present disclosure.

FIG. 1 is a diagram illustrating an example of a hardware implementation for a vehicle system 100, according to aspects of the present disclosure. The vehicle system 100 may be part of a passenger vehicle, a carrier vehicle, or other device. For example, as shown in FIG. 1, the vehicle system 100 may be a component of a component of an autonomous or semi-autonomous car 128. Aspects of the present disclosure are not limited to the vehicle system 100 being a component of the car 128, as other devices, including garments and other devices are also contemplated for using the vehicle system 100.

The vehicle system 100 may be implemented with a bus architecture, represented generally by a bus 130. The bus 130 may include any number of interconnecting buses and bridges depending on the specific application of the vehicle system 100 and the overall design constraints. The bus 130 may link together various circuits including one or more processors and/or hardware modules, represented by a processor 120, a communication module 122, a location module 118, a sensor module 102, an locomotion module 126, a planning module 124, and a computer-readable medium 114. The bus 130 may also link various other circuits such as timing sources, peripherals, voltage regulators, and power management circuits, which are well known in the art, and therefore, will not be described any further.

The vehicle system 100 may include a transceiver 116 coupled to the processor 120, the sensor module 102, a depth system 108, the communication module 122, the location module 118, the locomotion module 126, the planning module 124, and the computer-readable medium 114. The transceiver 116 is coupled to an antenna 134. The transceiver 116 communicates with various other devices over a transmission medium. For example, the transceiver 116 may send and receive commands via transmissions to and from a server or a remote device, such as remote device or server (not shown).

The depth system 108 may include the processor 120 coupled to the computer-readable medium 114. The processor 120 may perform processing, including the execution of software stored on the computer-readable medium 114 providing functionality according to the disclosure. The software, when executed by the processor 120, causes the vehicle system 100 to perform the various functions described for a particular device, such as car 128, or any of the modules 102, 108, 114, 116, 118, 120, 122, 124, 126. The computer-readable medium 114 may also be used for storing data that is manipulated by the processor 120 when executing the software.

The sensor module 102 may be used to obtain measurements via different sensors, such as a first sensor 104, a second sensor 106. The first sensor 104 may be a motion sensor, such as an accelerometer, gyroscope, inertial measurement unit, or the like. The second sensor 106 may include a visual sensor, such as a monocular camera, stereoscopic camera, a red-green-blue (RGB) camera, LIDAR or RADAR. Of course, aspects of the present disclosure are not limited to the aforementioned sensors as other types of sensors, such as, for example, thermal, sonar, and/or lasers are also contemplated for either of the sensors 104, 106. The measurements of the sensors 104, 106 may be processed by one or more of the processor 120, the sensor module 102, the depth system 108, the communication module 122, the location module 118, the locomotion module 126, the planning module 124, in conjunction with the computer-readable medium 114 to implement the functionality described herein. In one configuration, the data captured by the first sensor 104 and the second sensor 106, may be transmitted to an external device via the transceiver 116. The sensors 104, 106 may be coupled to the car 128 or may be in communication with the car 128.

The location module 118 may be used to determine a location of the car 128. For example, the location module 118 may use a global positioning system (GPS) to determine the location of the car 128. For example, the vehicle system 100 may be able to communicate with a remote monitoring service, such as mapping/navigation service, a weather service, or other environmental information provider.

The communication module 122 may be used to facilitate communications via the transceiver 116. For example, the communication module 122 may be configured to provide communication capabilities via different wireless protocols, such as Bluetooth, Wi-Fi, long term evolution (LTE), 3G, 5G, or the like. The communications module may also be configured to establish a communication channel between the car 128 and an information provider. The communication module 122 may also be used to communicate with other components of the car 128 that are not modules of the depth system 108.

The planning module 124, as well as other modules described herein, may be software modules running in the processor 120, resident/stored in the computer-readable medium 114, one or more hardware modules coupled to the processor 120, or some combination thereof.

The depth system 108 may be in communication with the sensor module 102, the transceiver 116, the processor 120, the communication module 122, the location module 118, the locomotion module 126, the planning module 124, and the computer-readable medium 114. In one configuration, the depth system 108 may receive sensor data from the sensor module 102. The sensor module 102 may receive the sensor data from the sensors 104, 106, including images from a monocular camera. According to aspects of the disclosure, the sensor module 102 may filter the data to remove noise, encode the data, decode the data, merge the data, or perform other functions. In an alternate configuration, the depth system 108 may receive sensor data directly from the sensors 104, 106.

As shown in FIG. 1, the depth system 108 may receive image data from the sensor module including, for example, image data from a monocular camera. According to one aspect the depth system 108 may function to process monocular images and provide depth estimates for an environment (e.g., objects, surfaces, etc.) depicted therein. Moreover, while depicted as a standalone component, in one or more embodiments, the depth system 108 may be integrated with the locomotion module 126, the sensor module 102, or another module of the vehicle 128. The noted functions and methods will become more apparent with a further discussion of the figures.

Figure 2:
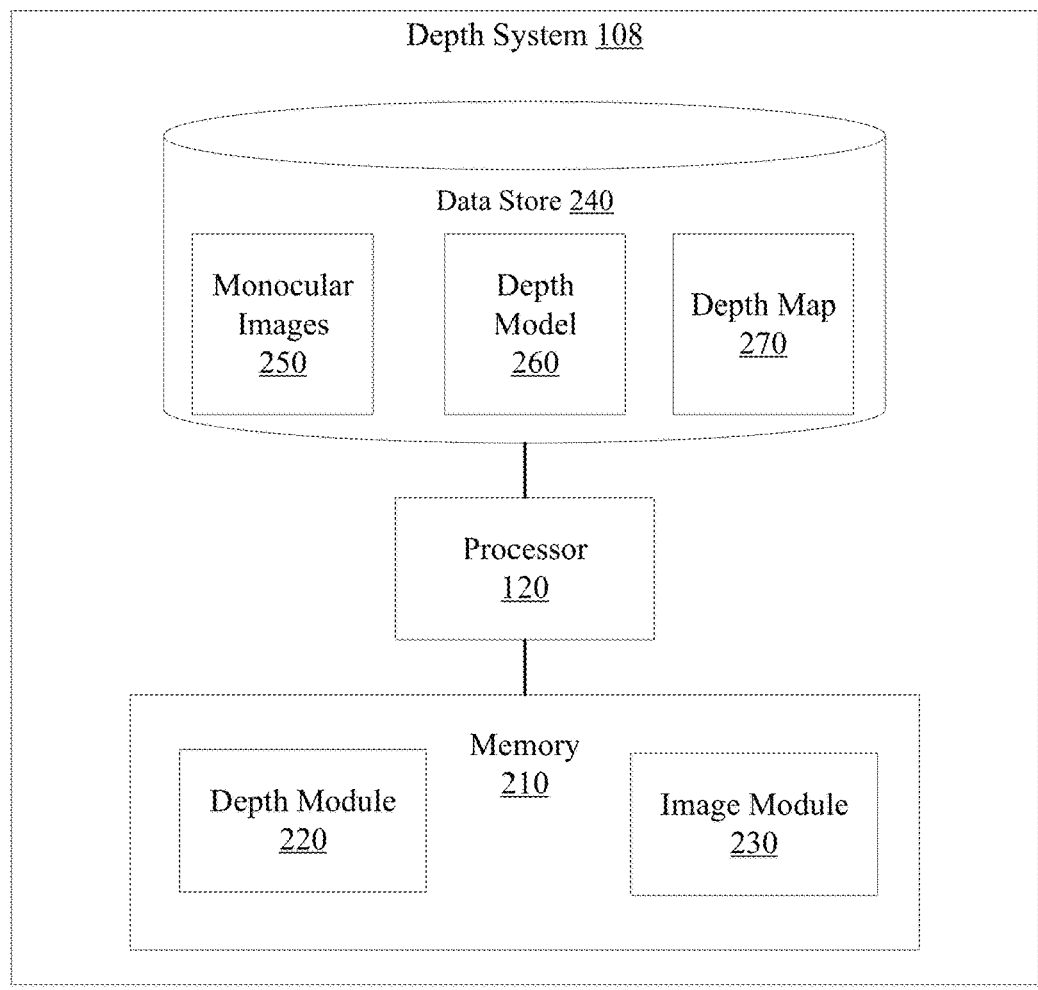
FIG. 2 is a diagram of a depth system according to one aspect of the present disclosure.

FIG. 2 depicts a diagram of a depth system 108 according to one aspect of the present disclosure. The depth system 108 may include or interface with the processor 120. Accordingly, the processor 120 may be a part of the depth system 108 or the depth system 108 may access the processor 120 through a data bus 130 (FIG. 1) or another communication path. According to at least one aspect, the processor 120 may be an application-specific integrated circuit (ASIC) that is configured to implement functions associated with a depth module 220 and an image module 230. In general, the processor 120 may be an electronic processor such as a microprocessor that is capable of performing various functions as described herein. According to one aspect, the depth system 108 may include a memory 210 that stores the depth module 220 and the image module 230. The memory 210 may be a random-access memory (RAM), read-only memory (ROM), a hard disk drive, a flash memory, or other suitable memory for storing the depth module 220 and image module 230. The depth module 220 and image module 230 may be, for example, computer-readable instructions that when executed by the processor 120 cause the processor 120 to perform the various functions disclosed herein.

The depth system 180 may include a data store 240. The data store 240 may be, according to one aspect, an electronic data structure stored in the memory 210 or another data store and may be configured with routines that can be executed by the processor 110 for analyzing stored data, providing stored data, organizing stored data, and so on. Thus, in one embodiment, the data store 240 stores data used by the depth module 220 and image module 230 in executing various functions. The data store 240 may include monocular image(s) 250, a depth model 260, and a depth map(s) 270 along with, for example, other information that is used by the depth module 220 and image module 230.

The monocular images 250 may be, for example, an image from a camera that encompasses a field-of-view about the vehicle 128 of at least a portion of the surrounding environment. That is, the monocular images 250 may be, according to one aspect, generally limited to a subregion of the surrounding environment. As such, the monocular images 250 may be of a forward-facing (i.e., the direction of travel) 60°, 90°, 120° field-of-view, a rear/side facing field-of-view, or some other subregion as defined by the characteristics of the camera. In further aspects, the camera may be an array of two or more cameras that capture multiple images of the surrounding environment and stitch the images together to form a comprehensive 360° view of the surrounding environment.

The monocular images 250 may include visual data of the field-of-view that is encoded according to an image standard (e.g., codec) associated with the camera. In general, characteristics of the camera and the image standard may define a format of the monocular images 250. While the particular characteristics may vary according to different implementations, in general, the monocular images 250 may have a defined resolution (i.e., height and width in pixels) and format. Thus, for example, the monocular images 250 may be generally an RGB visible light image. In further aspects, the monocular images 250 may be infrared images associated with a corresponding infrared camera, a black/white image, or another suitable format as may be desired. Whichever format that the depth system 108 implements, the monocular images 250 may be a monocular in that there is no explicit additional modality indicating depth. In contrast to a stereo image that may integrate left and right images from separate cameras mounted side-by-side, the monocular images 250 may not include explicit depth information such as disparity maps derived from comparing the stereo images pixel-by-pixel.

Instead, the monocular images 250 may provide depth information implicitly in the relationships of perspective and size of elements depicted in the monocular images 250 from which the depth module 220 derives the depth map 270 by using the depth model 260. The depth map 270, according to one aspect, may be a data structure corresponding to the monocular images 250 that indicate distances or depths to objects and features represented in the monocular images 250.

The depth module 220 generally may employ the depth model 260 to produce the depth map 270 as an inverse mapping having inverse values for the depth estimates. That is, instead of providing plain depth data, the depth module 220 may implement the depth model 260 to provide the depth estimates in an inverse form. Thus, depth module 220 may subsequently invert the values of the depth map 270 to provide the depth values or the image module 230 may separately invert the depth map 270 to generate depth estimates. Moreover, the depth module 220 may also selectively output the depth map 270 from the depth model 260 at different points in processing in order to provide the depth map 270 at different scales.

The depth module 220 may provide, for example, the depth map 270 at the different scales separately to different systems in the car 128 via the image module 230. That is, separate systems may function on finer or coarser resolutions of depth information depending on a particular task that is undertaken. Accordingly, the depth module 220 can separately provide the different scales to the various systems and/or omit subsequent processing where a fuller resolution form of the depth map 270 is not required. As such, the depth module 220 generally provides a robust implementation for resolving depth estimates that can be adapted to different systems.

According to one aspect, the image module 230 generally may include instructions that function to control the processor 110 to execute various actions in support of the depth module 220. For example, the image module 230 may receive the monocular images 250 from the camera and provide the monocular images 250 to the depth module 220. The image module 230 may receive the monocular images 250 by controlling the camera to capture the monocular images 250, by passively acquiring the monocular images 250 from a data bus or electronic memory, or the like. The image module 230 may also perform pre-processing on the monocular images 250 to provide the monocular images 250 in a format that is accepted by the depth model 260.

According to one aspect, the image module 230 may handle outputs from the depth module 220 and depth model 260. The image module 230 may include instructions to, for example, perform one or more post-processing routines, provide the depth map 270 to additional systems/modules in the car 128 in order to control the operation of the modules and/or the car 128 overall, and so on. In still further aspects, the image module 230 may communicate the depth map 270 to a remote system (e.g., cloud-based system) as, for example, a mechanism for mapping the surrounding environment or for other purposes (e.g., traffic reporting, etc.). As one example, the image module 230 may use the depth map 270 to map locations of obstacles in the surrounding environment and plan a trajectory that safely navigates the obstacles. Thus, the image module 230 may use the depth map 270 to control the car 128 to navigate through the surrounding environment.

In further aspects, the image module 230 may convey the depth map 270 to further internal systems/components of the car 128 such as the locomotion module 126. For example, the image module 230 may acquire the depth map 270 and convey the depth map 270 to the locomotion module 126 in a particular scale that the locomotion module 126 accepts as an electronic input. In this way, the depth system 170 may inform the locomotion module 126 of the depth estimates to improve situational awareness and planning of the locomotion module 126. As such, the locomotion module 126 may acquire the depth map 270 as a primary source of depth information for the surrounding environment or as a secondary source that verifies other image capture and processing capabilities (e.g., LiDAR data). It should be appreciated that the locomotion module 126 is indicated as one example, and, in further arrangements, the image module 230 may provide the depth map 270 to the locomotion module 126 and/or other components in parallel or as a separate conveyance.

According to one aspect of the present disclosure, the image module 230 includes instructions to train the depth model 260. The image module 230, may train the depth model 260 using a self-supervised structure from motion (SfM) process. Thus, to initiate the depth model 260, the image module 230 may use images from video of a scene and formulate the generation of the depth map 270 as a photometric error minimization across the images. In general, the image module 230 may train the depth model 260 by causing the depth module 220 to execute the depth model 260 as though typical operation is underway, however, the image module 230 may provide one or more images from the video as the monocular images 250 for processing.

As such, the image module 230 may use the resulting map 270 to synthesize the matching image of the pair from video in combination with a rigid-body transformation (e.g., 6-DoF SE(3)). Thus, in addition to the depth model 260, the depth system 170, in one approach, may implement a further machine learning algorithm in the form of a pose network that generates the rigid-body transformation according to the noted images (i.e., two images of the same scene from the video). The pose network may be, for example, another convolutional neural network. The image module 230 may then compare the synthesized images and the original images to determine an error, which is embodied as, for example, the photometric loss. This loss characterizes an accuracy of the depth model 260 in producing the depth map 270. Thus, the image module 230 may then use the calculated loss to adjust the depth model 260 thereby training the model 260 to produce depth estimates.

In general, the image module 230 may train the depth model 260 over a training data set of monocular video sequences that are generally comprised of many separate images. According to one aspect, the depth model 260 may be overfit and trained by a series or number of images of the same environment of interest, or substantially the same environment of interest. The depth model may include self-supervised pose and depth networks trained, for example, on multiple images of the same city block or route trajectory. The repetitive training of the depth model 260 on the same or substantially the same environment serves to overfit the depth model 260 causing it to adjust to very specific random features of the training data that may not have a causal relation to more generalized scenario or different domain. Overfitting the depth model 260 may increase the performance in the training data at the learning or training stage.

According to one aspect of the present disclosure, one aim of depth and ego-motion self-supervised training may be to learn generalizable features that may be used in other settings to estimate depth and ego-motion from camera images. By repeatedly training on a limited amount of (training) data, the ability of the pose and depth network to generalize to unseen environments can be discarded. Instead, networks may be obtained that are highly specialized to the training domain on which they are trained.

Through this training process, the depth model 260 develops a learned prior of the monocular images 250 as embodied by the internal parameters of the depth model 260 from the training on the images. In general, the depth model 260 develops the learned understanding about how depth relates to various aspects of an image according to, for example, size, perspective, and so on. Consequently, the resulting trained depth model 260 is leveraged by the depth system 170 to estimate depths from monocular images that do not include an explicit modality identifying the depths.

Figure 3:
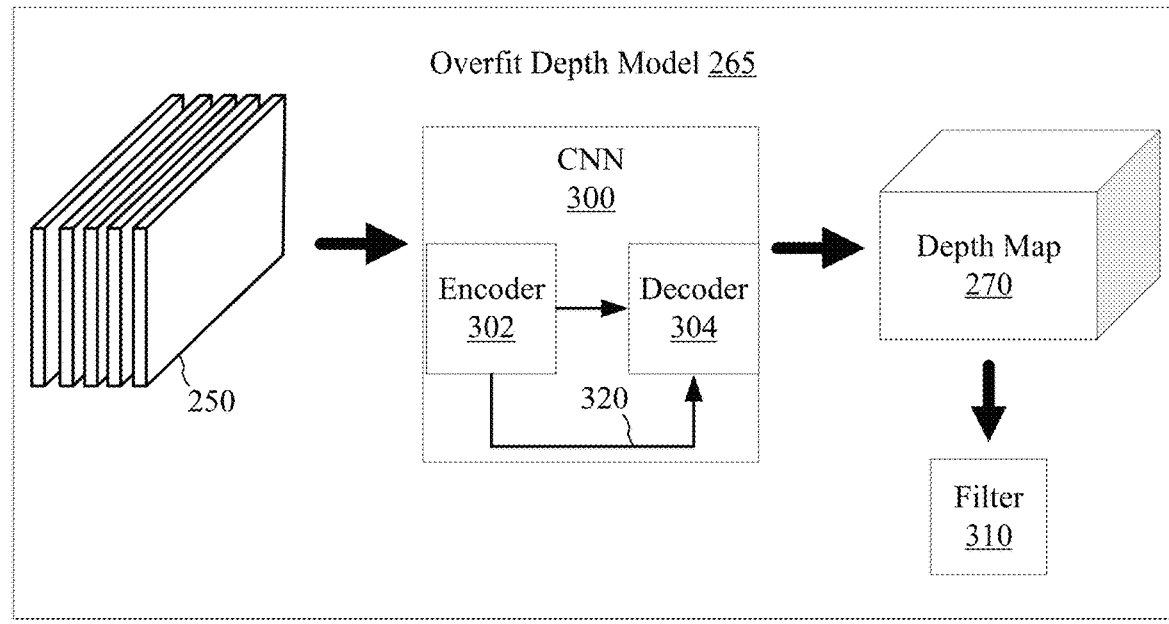
FIG. 3 is a diagram of an image model according to one aspect of the present disclosure.

FIG. 3 depicts a diagram of an overfit depth model 265 according to an aspect of the present disclosure. In particular, the overfit depth model 265 may identify an exemplary flow of a processing channel formed by the overfit depth model 265 for processing monocular images 250. It should be appreciated that the overfit depth model 265 is generally a machine learning algorithm/model that may be broadly characterized as a convolutional neural network (CNN 300) or as an encoder/decoder architecture including convolutional components.

According to one aspect, the monocular images 250 may be provided as an input into the overfit depth model 265. The overfit depth model 265 may include a CNN 300 that accepts the monocular images 250 as electronic input and processes the monocular images 250 to extract features from the monocular images 250. The features are, in general, aspects of the images that are indicative of spatial information that are intrinsically encoded therein.

The overfit depth model 265, according to one aspect may include an encoder 302 that accepts the monocular images 250 as an electronic input and processes the monocular images 250 to extract features. The features are, in general, aspects of the monocular images 250 that are indicative of spatial information that are intrinsically encoded therein. As such, encoding layers that form the encoder 302 function to fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular images 250.

Accordingly, the encoder 302 may be comprised of multiple encoding layers formed from a combination of two-dimensional (2D) convolutional layers, packing blocks, and residual blocks. Moreover, the separate encoding layers generate outputs in the form of encoded feature maps (also referred to herein as tensors), which the encoding layers provide to subsequent layers in the overfit depth model 265. Thus, the encoder 302 may include a variety of separate layers that operate on the monocular images 250, and subsequently on derived/intermediate feature maps that convert the visual information of the monocular images 250 into embedded state information in the form of encoded features of different channels. In this way, the encoder 302 may avoid loss of information as may occur in traditional approaches that use striding and pooling layers. In any case, the output of the encoder 302 may be, in one approach, a feature map having a particular dimension (e.g., 512×H/32×W/32) that is transformed in relation to the monocular images 250 (e.g., 3×H×W) as a function of the various encoding layers packing the features into additional channels.

The overfit depth model 265 may further include a decoder 304. In one embodiment, the decoder 304 may unfold (i.e., adapt dimensions of the tensor to extract the features) the previously encoded spatial information in order to derive the depth map 270 according to learned correlations associated with the encoded features. That is, the decoding layers generally may function to up-sample, through sub-pixel convolutions and other mechanisms, the previously encoded features into the depth map 270. In one aspect, the decoding layers may comprise unpacking blocks, two-dimensional convolutional layers, and inverse depth layers that function as output layers for different scales. As previously noted, the disclosed architecture of the encoder 302 may include packing blocks that fold encoded features into additional channels in order to preserve spatial information across the separate layers.

In addition to folding the encoded features into the additional channels, the encoder 302 may provide residual information directly to the decoder 304 via skip connections 320. While illustrated as a single connection between the encoder 302 and the decoder 304, in practice, the skip connections 320 may be, for example, between multiple layers (e.g., four or more) of the encoder 302 and the decoder 304 in order to convey higher resolution encoded information between the two, thereby facilitating a flow of information (e.g., feature maps and gradients) to improve the depth map 270 (e.g., increase available detail).

A resulting depth map 270 may be generated. The depth map, including pose and depth networks may be used to generate high-fidelity three-dimensional reconstructions of the environment of interest. According to one aspect, the depth network may project two dimensional pixels into three-dimensional points, while the pose network outputs the relative pose between pairs of images. For example, given a sequence of images, by stacking these relative poses between images (0,1) & (1,2) & (2,3) . . . (n−1, n), the pose for image n may be obtained in the global frame of reference with origin at image 0. Moreover, because the pose network is overfitting to this image sequence, the pose of image n may be expected to be very accurate.

The depth map 270 may output to a filter 310 to further process the feature maps extracted in the CNN 300. The filter 310 may include consistency checks to filter out dynamic objects, so the resulting map only contains the static portions of the environment. As the system processes multiple monocular images 250, over time, of the same environment of interest to generate the overfit depth model 265, inconsistencies, such as non-static or temporary objects may form part of any given map. These non-static or temporary objects, such as pedestrians, parked cars, or the like, may be considered noise as they are not relevant to recreating the permanent three-dimensional environment. As such, according to one aspect, once the depth map 270 is generated, and knowing the map's location, it may be compared against other generated depth maps of the same location. Comparing two or more maps to identify and filter out such objects leads to the generation of a more accurate reconstruction of the environment of interest.

While the overfit depth model 265 in FIG. 3 is shown as a discrete unit separate from the depth system 170, the overfit depth model 265 may be generally integrated with the depth module 220. That is, the depth module 220 functions to execute various processes of the overfit depth model 265 and use various data structures of the overfit depth model 265 in support of such execution. Accordingly, in one embodiment, the depth module 220 includes instructions that function to control the processor 120 to generate the depth map 270 using the overfit depth model 265 as disclosed.

Figure 4:
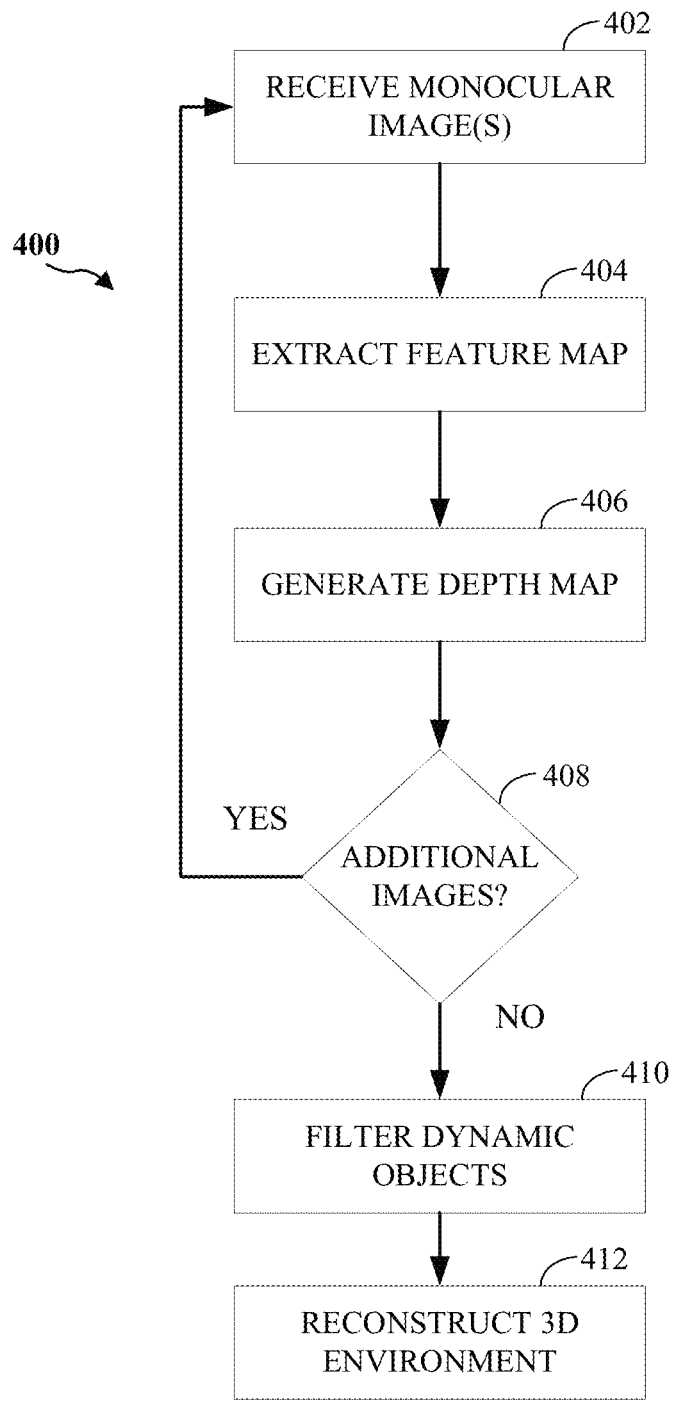
FIG. 4 depicts a method of estimating depths within a surrounding environment from monocular images.

FIG. 4 depicts a method 400 of estimating depths within a surrounding environment from monocular images. As described herein, and shown in block 402, the depth system may receive a series of monocular images from an image sensor or image capture device of an environment of interest. The depth system may, as shown in block 404, extract a feature a map from the monocular images according to an overfit depth model, described herein. The overfit depth model may be, for example, a convolutional neural network in the form of an encoder/decoder architecture. The output of the convolutional neural network may be used to generate a depth map, as shown in bock 406 and described herein.

According to one aspect, as shown in block 408, the depth system may determine if the system, memory, image sensors, or cameras have additional images of the same environment of interest to process. If there are additional images of the same, or substantially the same environment, the method 400 may return to receive/input the additional images for processing.

If no additional images are present, as shown in 410, the depth system may identify and filter dynamic objects from the depth map(s) by comparing the series of maps to identify objects indicative of transient, non-static, or otherwise irrelevant objects. As shown in block 412, the system may use the filtered depth maps to generate a high-fidelity, three-dimensional reconstruction of the environment.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A system for generating depth estimates of an environment, comprising:
   one or more processors;
   a memory communicably coupled to the one or more processors and storing:
      a depth system including instructions that when executed by the one or more processors cause the one or more processors to generate a plurality of depth maps by:
         receiving a plurality of monocular images, each of the plurality of monocular images capturing substantially the same environment of interest;
         processing each of the monocular images according to an overfit depth model;
         filtering the plurality of depth maps to remove non-static objects by comparing non-consecutive depth maps of a route trajectory;
      an image module including instructions that when executed by the one or more processors cause the one or more processors to generate a permanent three-dimensional reconstruction of the environment and the route trajectory including locations of obstacles based on the plurality of depth maps; and
      a planner module to plan a trajectory of a car that safely navigates the obstacles.

2. The system of claim 1 wherein the overfit depth model comprises a convolutional neural network.

3. The system of claim 1 wherein the overfit depth model comprises a pose network.

4. The system of claim 3 wherein the pose network outputs a relative pose between a pair of monocular images.

5. The system of claim 1 wherein the overfit depth model comprises a depth network.

6. The system of claim 5 wherein the depth network projects two dimensional pixels into three dimensional points.

7. A method of generating depth estimates of an environment, the method comprising:
   receiving a plurality of monocular images, each of the plurality of monocular images capturing substantially the same environment of interest;
   processing each of the monocular images according to an overfit depth model to generate a plurality of depth maps;
   filtering the plurality of depth maps to remove non-static objects by comparing non-consecutive depth maps of a route trajectory;
   generating from the plurality of depth maps a permanent three-dimensional reconstruction of the environment and the route trajectory including locations of obstacles; and
   planning a trajectory of a car that safely navigates the obstacles.

8. The method of claim 7 wherein the overfit depth model comprises a convolutional neural network.

9. The method of claim 7 wherein the overfit depth model comprises a pose network.

10. The method of claim 9 wherein the pose network outputs a relative pose between a pair of monocular images.

11. The method of claim 7 wherein the overfit depth model comprises a depth network.

12. The method of claim 11 wherein the depth network projects two dimensional pixels into three dimensional points.

13. A non-transitory computer-readable medium for generating depth estimates of an environment and including instructions that when executed by one or more processors cause the one or more processors to:
   receive a plurality of monocular images, each of the plurality of monocular images capturing substantially the same environment of interest;
   process each of the monocular images according to an overfit depth model to generate a plurality of depth maps;
   filter the plurality of depth maps to remove non-static objects by comparing non-consecutive depth maps of a route trajectory;
   generate from the plurality of depth maps a permanent three-dimensional reconstruction of the environment and the route trajectory including locations of obstacles; and
   plan a trajectory of a car that safely navigates the obstacles.

14. The non-transitory computer-readable medium of claim 13 wherein the overfit depth model comprises a convolutional neural network.

15. The non-transitory computer-readable medium of claim 13 wherein the overfit depth model comprises a pose network.

16. The non-transitory computer-readable medium of claim 15 wherein the pose network outputs a relative pose between a pair of monocular images.

17. The non-transitory computer-readable medium of claim 1 wherein the overfit depth model comprises a depth network.

* * * * *